(12) United States Patent
Bear et al.

(10) Patent No.: US 7,922,847 B2
(45) Date of Patent: Apr. 12, 2011

(54) LIGHT POLARIZING PRODUCTS AND METHOD OF MAKING SAME

(75) Inventors: Marie-Maud Bear, Morigny-Champigny (FR); Michele Marie-Louise Meyer-Fredholm, Hericy (FR); David Henry, Morigny-Champigny (FR); Xavier Gerard Lafosse, Gif-sur-Yvette (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/578,192

(22) Filed: Oct. 13, 2009

(65) Prior Publication Data
US 2010/0028532 A1     Feb. 4, 2010

Related U.S. Application Data

(62) Division of application No. 11/313,057, filed on Dec. 19, 2005, now Pat. No. 7,625,626.

(60) Provisional application No. 60/653,547, filed on Feb. 15, 2005.

(51) Int. Cl.
*B32B 3/00*    (2006.01)
*B32B 3/30*    (2006.01)
*B32B 9/04*    (2006.01)
*G02C 7/00*    (2006.01)
*G02C 7/10*    (2006.01)

(52) U.S. Cl. ............. 156/99; 156/74; 351/159; 351/163; 359/483; 359/485; 359/490; 359/491; 359/558; 428/30; 428/130; 428/156; 428/163; 428/167; 428/411.1

(58) Field of Classification Search .................. 428/167, 428/30, 130, 156, 163, 411.1; 156/74, 99; 351/159, 163; 359/483, 485, 490, 491, 558
See application file for complete search history.

(56) References Cited

U.S. PATENT DOCUMENTS

| | | | | |
|---|---|---|---|---|
| 2,400,877 | A | 5/1946 | Dreyer | 359/0 |
| 4,130,672 | A | 12/1978 | Onoki et al. | 427/164 |
| 4,261,656 | A | 4/1981 | Wu | 351/163 |
| 4,404,290 | A | 9/1983 | Boudot et al. | 501/78 |
| 4,498,728 | A | 2/1985 | Thoni et al. | 350/1.7 |
| 4,540,672 | A | 9/1985 | Boudot et al. | 501/65 |
| 4,648,925 | A * | 3/1987 | Goepfert et al. | 156/153 |
| 4,683,153 | A | 7/1987 | Goepfert et al. | 428/131 |
| 4,742,028 | A | 5/1988 | Boudot et al. | 501/78 |
| 4,839,314 | A | 6/1989 | Boudot et al. | 501/78 |
| 4,865,668 | A | 9/1989 | Goepfert et al. | 156/74 |
| 5,023,209 | A | 6/1991 | Grateau et al. | 501/13 |
| 5,223,862 | A | 6/1993 | Dasher et al. | 351/163 |
| 5,286,419 | A | 2/1994 | Van Ligten et al. | |
| 5,412,505 | A | 5/1995 | Van Ligten et al. | |

(Continued)

FOREIGN PATENT DOCUMENTS
DE          19513097          10/1996
(Continued)

*Primary Examiner* — Brent T O'Hern
(74) *Attorney, Agent, or Firm* — Siwen Chen; Robert P. Santandrea (57) ABSTRACT

Disclosed are novel light polarizing articles comprising a substrate, a light polarizing layer, an inorganic intermediate layer between the polarizing layer and the substrate, an optional inorganic sub-layer between the substrate and the inorganic intermediate layer, and a protective layer over the light polarizing layer, and method of making the same. Due to the presence of the inorganic intermediate layer and the optional sub-layer, adhesion of the polarizing layer is improved substantially. The light polarizing article has improved chemical, mechanical and thermal resistance. The light polarizing article can be used, for example, as ophthalmic products and in display devices.

8 Claims, 1 Drawing Sheet

U.S. PATENT DOCUMENTS

| | | | |
|---|---|---|---|
| 5,426,077 A | 6/1995 | Brocheton et al. | 501/13 |
| 5,597,622 A | 1/1997 | Zoller et al. | 427/463 |
| 5,827,614 A | 10/1998 | Bhalakia et al. | 428/411.1 |
| 6,121,176 A | 9/2000 | Comte et al. | 501/78 |
| 6,180,245 B1 | 1/2001 | Janssen et al. | 428/426 |
| 6,220,703 B1 | 4/2001 | Evans et al. | 351/163 |
| 6,248,258 B1 | 6/2001 | Tomita et al. | 252/188 |
| 6,329,482 B1 | 12/2001 | Henry | 526/260 |
| 6,632,535 B1 * | 10/2003 | Buazza et al. | 428/447 |
| 2002/0090516 A1 | 7/2002 | Loshak et al. | 428/412 |
| 2003/0116270 A1 | 6/2003 | Hawa et al. | 156/307.1 |
| 2004/0070726 A1 | 4/2004 | Ishak | 351/163 |
| 2006/0066947 A1 * | 3/2006 | Henry | 359/491 |
| 2006/0176571 A1 | 8/2006 | Mosse et al. | 359/643 |
| 2007/0207284 A1 | 9/2007 | McClintic | 428/40.1 |

FOREIGN PATENT DOCUMENTS

| | | |
|---|---|---|
| EP | 0171917 A1 | 7/1985 |
| EP | 1174738 A2 | 7/2001 |
| FR | 2861852 | 10/2003 |
| JP | 58042001 A | 3/1983 |
| JP | 60159706 | 8/1985 |
| WO | 00/22463 A1 | 4/2000 |
| WO | WO00/22463 | 4/2000 |
| WO | 01/87579 A1 | 11/2001 |
| WO | 02/056066 A1 | 7/2002 |
| WO | 02/073291 A1 | 9/2002 |
| WO | 2005/050265 A1 | 2/2005 |
| WO | WO 2005/050265 | 6/2005 |

* cited by examiner

FIG. 1

LIGHT POLARIZING PRODUCTS AND METHOD OF MAKING SAME

CROSS-REFERENCE TO RELATED APPLICATIONS

This is a divisional application of U.S. patent application Ser. No. 11/313,057, filed on Dec. 19, 2005 now U.S. Pat. No. 7,625,626, which claims the benefit of U.S. Provisional Patent Application Ser. No. 60/653,547, filed on Feb. 15, 2005. The contents of both of the above-referenced applications are relied upon and incorporated herein by reference in their entirety.

FIELD OF THE INVENTION

The present invention relates to light polarizing products and method of making the same. In particular, the present invention relates to polarizing ophthalmic products comprising a light polarizing layer, a substrate and at least one adhesion layer therebetween and method of making the same. The present invention is useful in producing, for example, polarizing ophthalmic products and display products.

BACKGROUND OF THE INVENTION

A linear light polarizing filter allows light having electric field in a certain plane to transmit at a higher rate than light having an orthogonal electric filed. Polarizing filters have been widely used in, for example, ophthalmic products, display devices and optical communication devices. Polarizing ophthalmic lenses are interesting because they have the unique ability to selectively eliminate glare that is reflected from smooth horizontal surfaces like water and ice.

Dichroic materials have been used for the manufacture of light polarizing articles. Dichroic materials, when properly oriented, can preferentially transmit light polarized in a particular direction. Such dichroic material may be polarizing over a relatively wide spectrum, such as the visible spectrum, or they may have the polarization property over a narrow range of wavelength. A group of dichroic material is called pleochroic dyes. A pleochroic dye molecule has varying absorption depending on the orientation of the electric field of the incident light. Some pleochroic dyes are self-orienting when placed on a suitable substrate, others has to be combined with other materials to produce the polarizing effect.

As taught by U.S. Pat. No. 2,400,877, an oriented dichroic dye layer may be formed by depositing them onto a surface that has been gently brushed or rubbed in a single direction. This patent reference also discloses that by stretching a polymeric film, such as cellulose and derivatives thereof, proper orienting force may be obtained for dichroic dyes deposited thereon.

Light polarizing articles, such as polarizing ophthalmic lenses, have been manufactured by using various technologies and materials. Most of these products comprise a light polarizing layer in addition to a non-polarizing substrate. The polarizing layer is mostly formed from a dichroic material mentioned above. The light polarizing products produced and processes for the manufacture thereof have hitherto suffered from various drawbacks.

One problem of the prior art product is the distortion of the optical surface by the polarizing layer in the final product. Some of the light polarizing articles in the prior art are produced by laminating a pre-formed polarizing layer to a substrate. It is difficult, if not impossible, to allow the pre-formed polarizing layer to curve to a perfect fit with a contoured surface of the substrate, as is in the case of ophthalmic products. The less than perfect fit between the polarizing layer and the substrate can lead to undesired cylindrical power in an ophthalmic lens.

A second problem of the prior art process and products is delaminating of the polarizing layer from the substrate during the manufacture process or during the life of the product. This is caused by, for example, (i) a less sufficient adhesion between the substrate and the polarizing layer; or (ii) stress between the layers having differing properties, especially differing thermal expansion coefficient.

Still another problem of the prior art polarizing product and processes for making them involves the leaching of substrate component into the polarizing layer. The leaching, or migration, can cause the deterioration of the mechanical and/or optical quality of the polarizing layer over time.

A fourth problem of the prior art article and process is the hazing of the article. Various causes contribute to this problem. The propagation and expansion of defects, optical and mechanical, on a micro-scale originally, is believed to be the leading culprit.

In addition to the above generally mentioned problems, the specific methods mentioned in the prior art, summarized as follows, have their own unique problems.

Firstly, most of the processes used for the manufacturing of such polarizing articles are based on gluing or embedding organic polarizing films which must be purchased from polarizing film suppliers. For example, WO 0187579 discloses an optical plastic part made by forming a PET polarizing film to a desired contour and incorporating the film into a plastic part before molding. Unfortunately such a process can be carried out only on the lens manufacturing site and not in a prescription laboratory. Moreover films are difficult to be deformed enough to match the curvature radius of high power lenses without optical distortion hence limiting this process to low power lenses.

U.S. Pat. No. 5,286,419 discloses a process for making a light polarizing spectacle lens and U.S. Pat. No. 5,412,505 describes a light polarizing spectacle lens including a lens body and a light polarizing film embedded in the lens body. The lens body is made from a monomer mixture comprising a pre-gelled monomer, conventional monomer and isopropyl carbonate. This process involving the casting of the lens cannot be performed in a prescription lab.

WO 02/073291 describes an optical-quality polarized parts and methods for manufacturing the optical part. The optical polarized part comprises a high impact high optical quality polyurethane construct and a polarizer bonded to the construct. In this process the polarizer is placed in contact with liquid phase polymeric material resulting in a laminate structure. Unfortunately such described processes based on the embedding of polarizing film into the lens body can be used only on the lens manufacturing site.

WO 00/22463 describes a polarizer that is formed of a host matrix and a guest dye. The host matrix is a lyotropic liquid crystal matrix having a predetermined orientation. A guest pleochroic dye is disposed within the host lyotropic liquid crystal matrix. The guest dye is oriented by the orientation of the host matrix. The orientation of the host dye is obtained by applying a sufficient shear to the aqueous dye layer during coating. Such process can be easily used on flat substrate by shear application using a doctor blade process as disclosed in EP 1 174738 and WO 02/056066 but cannot be easily used on curved substrate such as lenses.

Another example of polarizing article based on the use of liquid crystal dyes is described in EP 01 71917. This patent describes a transparent laminated polarizing glass articles comprising a support of an inorganic or organic glass, a coating exhibiting polarizing properties applied to one of the surface of the support and an optically transparent polyurethane adhesive laminate having anti-lacerative properties.

U.S. Pat. No. 4,683,153 describes a method for the preparation of a similar transparent laminated polarizing glass article consisting of an inorganic or organic glass, a polarizing coating disposed on one of the surface of the support and a transparent layer adhered to the coating protecting it from humidity. This patent describes a process which consists in first forming microgrooves directly on the surface of the lens by brushing, washing and drying the surface, depositing the organic dyes exhibiting a nematic phase, reducing the water solubility of the dye by ion exchange in an acidic solution, protecting the fixed dye layer by a first coating of aminopropylsilane, contacting the coated lens with an epoxy silane, condensing the silane layers and applying a protective layer to form a barrier layer against humidity.

It is well known that the directors of many nematic liquid crystals tend to assume an orientation parallel to the direction in which an adjacent solid surface has previously rubbed. U.S. Pat. No. 2,400,877 reports that parallel alignment is based primarily on geometric factors rather than detailed molecular forces. Consequently the micro-grooves have to be well defined in order to provide an efficient and reproducible polarization effect. This is particularly difficult because plastic lenses are made of materials having a wide range of hardness hence microgrooves machining parameters must be finely tuned for each substrate having differing composition and/or geometry. This makes the process time consuming and less economical.

More recently, French patent application publication No. 2861852 (application No. FR 03 12686) describes an optical product that includes a polymer layer fixed on the substrate, the polymer layer being grooved in order to align dyes hence providing the polarizing effect. This process that involves grooving an intermediate polymer layer instead of grooving the substrate itself is interesting because polarizing articles can be made from different substrates whatever their intrinsic surface hardness. Unfortunately the article described in this invention suffers of lack of sufficient adhesion between the dye layer and the intermediate polymer layer. Therefore the polarizing articles described exhibit poor durability. Moreover the articles are difficult to make because the dyes layer may delaminate during the manufacturing process. Such delaminating may occur particularly during the steps that involve immersing the lenses in aqueous bath. For example, the dye layer may delaminate at the step where the water-soluble form of the dye is converted into a water-insoluble form by dipping in an aqueous solution of metal salts such as salt of aluminum, zinc, barium or any other metals that are known to give water insoluble form of the polarizing dyes.

Consequently there is a genuine need for a process to prepare a polarizing article overcoming the drawbacks of the prior art.

SUMMARY OF THE INVENTION

According to a first aspect of the present invention, it is provided a light polarizing article comprising a light transmitting substrate having at least one surface, a light polarizing layer over at least part of the surface, and a protective layer over the polarizing layer, characterized in that, between the substrate and the light polarizing layer, there is an inorganic intermediate layer having a composition differing from that of the substrate abutting the light polarizing layer.

In a preferred embodiment of the light polarizing article of the present invention, the inorganic intermediate layer comprises a plurality of microgrooves on the side farther from the substrate, and the light polarizing layer comprises light polarizing dye deposited directly on the grooved side of the inorganic intermediate layer. The microgrooves are preferably substantially parallel to each other. Preferably, the polarizing layer is deposited in situ over the grooves such that the polarizing dye is deposited in and over the grooves.

In a preferred embodiment of the light polarizing article of the present invention, the inorganic intermediate layer comprises an oxide of silicon, a metal oxide, or a compatible mixture or combination thereof. Preferably, the inorganic intermediate layer is formed by a material selected from the group consisting of oxides of Si, Al, Zr, Ti, Ge, Sn, In, Zn, Sb, Ta, Nb, V, Y, and mixtures and combinations thereof. In a particularly preferred embodiment of the light polarizing article of the present invention, the inorganic intermediate layer is formed by SiO or $SiO_2$.

In one embodiment of the light polarizing article of the present invention, it further comprises, between the substrate and the inorganic intermediate layer, at least one inorganic sub-layer promoting the adhesion of the inorganic intermediate layer to the substrate, the inorganic sub-layer being different from the inorganic intermediate layer in composition. Preferably, the inorganic sub-layer comprises elemental metal, an oxide of silicon, or a metal oxide. More preferably, the inorganic sub-layer consists essentially of chromium metal or SiO.

In a particularly preferred embodiment of the light polarizing article of the present invention, it comprises, as the inorganic intermediate layer, a layer of $SiO_2$, and as the inorganic sub-layer, a layer of SiO.

In another particularly preferred embodiment of the light polarizing article of the present invention, it comprises, as the inorganic intermediate layer, a layer of $SiO_2$, and as the inorganic sub-layer, a layer of chromium metal.

The substrate of the light polarizing article of the present invention may be based on an inorganic material, for example, various types of inorganic glass or crystalline materials, or based on an organic material, for example, various types of polymer materials.

The substrate of the light polarizing article of the present invention may comprise at least one layer of hardcoat on a surface, over which the intermediate coating is formed.

The light polarizing article of the present invention may be ophthalmic products, including prescription lenses and sunglasses, and the like, as well as light transmitting medium for application in, inter alia, display devices, vehicle windows, sun visors, and building windows.

A second aspect of the present invention is a process for producing the light polarizing article of the present invention, described above, comprising the following steps:

(A) providing a light transmitting substrate having at least one surface;

(C) forming a light polarizing layer comprising a polarizing dye over at least part of the surface;

(D) forming a protective layer over and abutting the light polarizing layer;

characterized in that:

between steps (A) and (C), there is an additional step (B) as follows:

(B) depositing an inorganic intermediate layer between the polarizing layer and the substrate, said inorganic intermediate layer abutting the polarizing layer; and further in that step (C) comprises the following steps (C1) and (C2):

(C1) forming a plurality of micro-grooves on the surface of the inorganic intermediate layer deposited in step (B) farther from the substrate; and (C2) depositing a light polarizing layer over and abutting the micro-grooves formed in step (C1).

Preferably, in step (C1), the micro-grooves formed are substantially parallel to each other. Preferably, in step (C2), the light polarizing layer is deposited in situ over and abutting the micro-grooves formed in step (C1), such as at least part of the polarizing dye is deposited in the micro-grooves.

In a preferred embodiment of the process of the present invention, it comprises an additional step (A1) after step (A) as follows:

(A1) forming at least one adhesion-promoting inorganic sub-layer differing from the inorganic intermediate layer between the substrate and the inorganic intermediate layer; wherein in step (B), the inorganic intermediate layer is formed directly over and abuts an inorganic sub-layer formed in step (A1).

Preferably, the at least one inorganic sub-layer is formed of silicon, an elemental metal, an oxide of silicon, or an oxide of a metal. More preferably, the inorganic sub-layer is formed of SiO or chromium metal.

In a preferred embodiment of the process of the present invention, in step (B), the intermediate layer is formed from an oxide of silicon, a metal oxide, or a compatible mixture or combination thereof. Preferably, the intermediate layer is formed from a material selected from the group consisting of oxides of Si, Al, Zr, Ti, Ge, Sn, In, Zn, Sb, Ta, Nb, V, Y, and mixtures and combinations thereof.

The substrate used in step (A) in the process of the present invention may be based on an inorganic material, for example, various types of inorganic glass or crystalline materials, or based on an organic material, for example, various types of polymer materials. The substrate may comprise a pre-formed hardcoat layer or other surface layer before the formation of the inorganic intermediate layer. Alternatively, if a piece of blank is supplied without a hardcoat layer, such a hardcoat layer may be first deposited before the application of the inorganic intermediate layer.

The inorganic intermediate layer, as well as the inorganic sub-layer, if formed during the process, may be formed by using any method available in the prior art for producing thin inorganic layers, such as sol-gel processes, chemical vapor depositions, electronic sputtering, and the like. Preferably, the inorganic intermediate layer and the sub-layer, if present, are formed by using chemical vapor deposition.

The process of the present application has the advantage of being applicable to many different types of substrates, inorganic and organic, without the need of substantially altering the process parameters in steps (C) and (D). The process can be conveniently implemented in large manufacture plants and small ophthalmic laboratories alike by using relatively simple equipment, making it exceptionally suitable for both the production of sun-glass products and prescription ophthalmic products. Moreover, the process of the present invention can be conveniently applied to any type of surfaces, including planar, concave and convex surfaces having various degree of curvature, without imparting distortion to the surface contour.

In the structure of the light polarizing article of the present invention, the inorganic intermediate layer and the inorganic sub-layer, if present, function to enhance the adhesion of the polarizing layer and other layers to the substrate. The light polarizing dyes in the article of the present invention may be at least partly confined to the micro-grooves formed on the surface of the inorganic intermediate layer, they are less likely to be subject to loss of polarizing ability at a higher temperature than conventional polarizing films. As a result, the light polarizing article of the present invention has very good thermal resistance. In addition, the light polarizing article of the present invention has good mechanic integrity due to the stronger adhesion of the light polarizing layer. Moreover, the article of the present invention may be manufactured to have a very high polarizing efficiency. Further, by properly choosing the protective coating, the polarizing article of the present invention can be manufactured to have high chemical resistance.

Additional features and advantages of the invention will be set forth in the detailed description which follows, and in part will be readily apparent to those skilled in the art from the description or recognized by practicing the invention as described in the written description and claims hereof, as well as the appended drawing.

It is to be understood that the foregoing general description and the following detailed description are merely exemplary of the invention, and are intended to provide an overview or framework to understanding the nature and character of the invention as it is claimed.

The accompanying drawing is included to provide a further understanding of the invention, and is incorporated in and constitutes a part of this specification.

BRIEF DESCRIPTION OF THE DRAWING

In the accompanying drawing.

DETAILED DESCRIPTION OF THE INVENTION

As used herein, "ophthalmic product" means any semi-finished and finished, powered and non-powered, tinted and non-tinted, photochromic and non-photochromic, inorganic glass-based and polymer-based eyewear products, including sun-glass products and prescription eye-wear products, and blanks thereof, goggles; visors; and the like.

The term "intermediate layer" or "inorganic intermediate layer" as used herein denotes the layer between the polarizing layer and the substrate abutting the polarizing layer. The intermediate layer per se may have multiple layer structure. In this case, the layer closest to the polarizing layer abuts the polarizing layer.

The term "inorganic sub-layer" as used herein denotes an optional layer between the inorganic intermediate layer and the substrate abutting the inorganic intermediate layer. The inorganic sub-layer preferably abuts the surface of the light transmitting substrate.

Unless otherwise specified, the term "oxide" as used herein in the present application includes stiochiometric oxides, oxygen deficient and oxygen excess oxides. For example, the term oxide of silicon or silicon oxide in the present application means a material having the exact formula $SiO_x$, where x may be larger than 2 (oxygen excess) or smaller than 2 (oxygen deficient). However, $SiO_2$ means a stiochiometric oxide in which the molar ratio of Si and oxygen atoms is 1:2. For the purpose of the present application, the formula SiO means oxygen deficient silicon oxide $SiO_y$, where $0.5 \leq y \leq 1.8$, preferably $0.5 \leq y \leq 1.5$. For another example, the oxide of aluminum or aluminum oxide in the present application means a material having the exact chemical formula $Al_2O_z$, where z may be larger than 3 (oxygen excess) or smaller than 3 (oxygen deficient). Thus silicon or the metal in the oxides may be at various valencies, not just only the usual valencies. It is well known that chemical vapor deposition can be used to produce oxygen deficient or oxygen excess oxides of silicon and/or metals.

As mentioned above, French patent application publication No. 2861852 (application No. FR 03 12686) discloses a polarizing, transparent optical product, the structure of which comprises a basic transparent substrate of an inorganic or organic material and, on at least one part of the external surface of said basic substrate, a polarizing coating, wherein said polarizing coating is fixed, in a stable manner, to said substrate and has a stratified structure which includes:

a polymer layer, which is fixed to the external surface of said substrate, directly or via a coupling under-layer;

a film of colorant(s) having polarizing properties, on said polymer layer, and a protective layer on said film of colorant(s).

It is also disclosed in French application publication No. 2861852 that the polarizing layer may be deposited over a series of parallel grooves formed on the surface of the intermediate polymer player.

However, as disclosed above, the present inventors have found that the product disclosed in this reference, though satisfactory in many ways, do not possess sufficient durability because of the insufficient adhesion between the polarizing layer and the intermediate polymer layer.

The present inventors have surprisingly discovered that, instead of using a polymer intermediate layer as disclosed in French patent application publication No. 2861852, by using an inorganic intermediate layer, substantial improvement of adhesion of the polarizing layer has been achieved. To this extent, the present invention is a significant improvement over the technology disclosed in French patent application publication No. 2861852.

The light polarizing article of the present invention, in general terms, comprises: a light transmitting substrate having at least one surface, a light polarizing layer over at least part of the surface, and a protective layer over the polarizing layer, wherein between the substrate and the light polarizing layer, there is an inorganic intermediate layer having a composition differing from that of the substrate abutting the light polarizing layer.

The light transmitting substrate may take various shapes before the formation of the various layers described above. The substrate has at least one surface, which may be planar or contoured. The substrate may be a planar sheet, a cylindrical blank having various thickness, or, for ophthalmic products, a blank having at least one contoured surface, such as one concave surface, or one convex surface, or a convex and a concave surface. The inorganic intermediate layer, the polarizing layer and the inorganic sub-layer, if present, of the light polarizing article of the present invention, are formed over at least part of the surface. It is not excluded that the substrate has more than one surface, and the inorganic intermediate layer, the polarizing layer and the inorganic sub-layers, if present, are formed over more than one of those surfaces. For example, the substrate may have two surfaces substantially parallel to each other, or substantially opposite to each other, and the inorganic intermediate layer and the polarizing layer are deposited over both surfaces. The polarizing direction of the two polarizing layer thus formed over the two surfaces may be chosen to be parallel or orthogonal to each other, or form a certain angle therebetween, depending on the use of the light polarizing article of the present invention. Particularly, regarding ophthalmic products, the substrate may be a lens blank having one convex or concave surface, over which the inorganic intermediate layer and the polarizing layer are to be formed. For a lens blank, it is desired that the side that will not be further processed downstream is allowed to form the polarizing layer. For a prescription lens blank, that side usually is the concave side. For finished products, such as stock ophthalmic lenses and planar sun-glasses, the polarizing layer may be formed on either side, since usually no further surface grinding of the lens is required afterwards.

The light transmitting substrate may have a main body made of inorganic glass or organic polymer. As examples for such inorganic glass, mention can be made of typical alkaline earth aluminosilicate glasses, boroaluminosilicate (Pyrex®) glasses, doped and undoped fused silica glasses, transparent glass-ceramic materials, and crystalline materials, such as $CaF_2$, $MgF_2$, and the like. Particularly, for ophthalmic products, inorganic glass materials of special interest are those described in, for example, U.S. Pat. Nos. 4,839,314; 4,404,290 and 4,540,672. High refractive index inorganic glass materials disclosed in, for example, U.S. Pat. Nos. 4,742,028 and 6,121,176 are especially preferred.

Many polymer materials have been used as the substrate material for optical articles, including ophthalmic products. Such polymers may be polyamides, polyesters, polyimides, polysulfones, polycarbonates, polyurethanes, polyurethane-ureas, polyolefins, phenol resins, and epoxy resins, and the like. As non-limiting examples of organic polymer suitable for the light transmitting substrate, mention can be made of homopolymers and copolymers of polyol (allylcarbonate) monomers such as the diethylene glycol bis(allyl carbonate) sold under the trademark CR-39® by PPG Optical Products, homopolymers and copolymers of mono or poly-functional (meth)acrylate, cellulose acetate, cellulose triacetate, cellulose acetate butyrate, cellulose acetate propionate, polyvinyl (acetate), poly(vinyl alcohol), poly(vinyl chloride), polyurethanes, polyurethane-urea such as TRIVEX™ or NXT® respectively sold by PPG Optical Products and Intercast Europe Spa, poly(thiourethanes), polyamides, polycarbonates such as those derived from bisphenol-A and phosgene sold under the trade mark LEXAN®, polyesters such as poly (ethylene terephtalate), polystyrene, copolymers of styrene and methyl methacrylate or acrylonitrile, cyclic polyolefin copolymers (COC), amorphous polyolefin such as Zeonex® from ZEON Corp, and the like.

The main body of the light transmitting substrate may be photochromic or non-photochromic. Non-limiting examples of photochromic inorganic glass materials and preparation thereof are disclosed, for example, in U.S. Pat. Nos. 5,426,077 and 5,023,209. Non-limiting examples of photochromic polymer materials and preparation thereof are disclosed, for example, in U.S. Pat. Nos. 6,248,285 and 6,329,482.

The main body of the light transmitting substrate may be colored or colorless. Colored inorganic glass materials and method of making the same are described extensively in the art. Colored polymer materials may be produced by adding, for example, various organic dyes into the monomer before polymerization, or by impregnating the polymer matrix using organic dyes.

The light transmitting substrate may comprise, in addition to the main body, various layers of various types of surface coatings. For example, the substrate may bear anti-reflective coating, a hardcoat typical for ophthalmic products, a photochromic coating, a tinted color coating, a UV filtering coating, an infrared absorbing coating, and the like. One skilled in the art is familiar with these coatings, especially in connection with the ophthalmic products. The inorganic intermediate layer and the light polarizing layer may be formed over these surface coatings, or may be formed over a surface differing from or opposite to the surface on which these coatings were formed.

The light polarizing layer formed over at least part of at least one surface of the light transmitting substrate imparts, at least partly, the light polarizing property of the polarizing article of the present invention. The polarizing layer may comprise at least one dichroic dye as the active ingredient. The dichroic dye molecules are oriented such that they impart the desired polarizing effect to the article of the present invention. However, in addition to the dichroic dye, the polarizing layer may further comprise other ingredients, such as adhesion promoting agents, plasticizers, non-polarizing dyes and surfactants, for imparting a desirable color or hue to the end product, and the like, as long as these other ingredients (i) do not negatively impact the adhesion of the polarizing layer to the other layers in the structure of the article, and (ii) do not negatively impact the polarizing effect of the dichroic dyes in the layer.

As mentioned above, many different dichroic dyes are known and indeed were used in the manufacture of light polarizing products in the prior art. References mentioning such dichroic dyes include, for example, U.S. Pat. No. 2,400,877 and WO 00/22463. A single dichroic dye may be used in the polarizing layer to impart the polarizing effect as well as a desired color or tint, such as grey, to the end polarizing product. However, it is not excluded that a combination of various dichroic dyes may be used in the polarizing layer. Indeed, it is known to one skilled in that that various dichroic dyes having colors ranging from red, yellow to blue, may be used alone or in combination at various proportions to impart the desired polarizing effect and color to the final product.

It is also known in the art that dye molecules absorbing light at desired wavelength, but incapable of forming ordered or polarizing structures in and of themselves may form a light polarizing structure when used together with suitable host materials, such as liquid crystal compounds. Such guest-host polarizing phenomenon and structures are described in, e.g., WO 00/22463, and other references. This effect has been used for the production of liquid crystal displays. This type of polarizing layer can certainly be used for the light polarizing article of the present invention. One of the contemplated uses of the light polarizing article of the present invention is in liquid crystal displays. For the purpose of the present invention, the term "light polarizing dye" includes both dyes which can orient themselves to provide polarizing effect, and dyes which cannot orient themselves to provide polarizing effect, but can provide polarizing effect when placed in a proper host or in combination with other materials.

Pre-fabricated light polarizing layers comprising dichroic dyes have been disclosed and used in the prior art before. Non-limiting examples of such polarizing layers include polarizing polyvinyl alcohol (PVA), polyethylene terephthalate (PET) films, and the like. Many of these films are stand-alone polarizing films produced by stretching the polymer film having a layer of dichroic dye deposited thereon or imbibed therein. Multiple-layer polarizing wafers have been developed in the prior art as well for laminating to a substrate to form a polarizing article such as sunglasses. These polarizing films and wafers may be used in the present invention polarizing articles as the light polarizing layer in accordance with the methods available in the prior art.

However, as mentioned above, the use of pre-fabricated polarizing films and wafers can bring about undesired effects to the end product. Therefore, in the light polarizing article of the present invention, it is preferred that the light polarizing layer is a single layer bonded to the inorganic intermediate layer described in detail below. More preferably, the inorganic intermediate layer comprises a plurality of microgrooves on the outer side (the side farther from the substrate), and the polarizing layer is deposited in and over the microgrooves (formed or deposited in situ, e.g., from a solution of the polarizing dye as described in U.S. Pat. No. 2,400,877). Preferably, the microgrooves are substantially parallel to each other. The microgrooves are preferred to have a sub-micron size. That is, the width and depth of the grooves are preferred to be less than 1 μm. The grooves serve to provide orientation of the polarizing dyes in the polarizing layer, according to the teaching of U.S. Pat. No. 2,400,877. Preferably, the polarizing layer comprises at least one dichroic dye capable of orienting themselves in the presence of microgrooves to provide light polarizing effect. Such structure of polarizing dye on microgrooves was disclosed in French patent application publication No. 2861852, and is particularly advantageous for the present invention. The structure is simple, easy to produce, and is capable of providing consistent polarizing effect across the surface without distorting the light manipulating power of the final article. In this structure, the polarizing dye molecules are stably confined in their local position. Compared to polarizing films and wafers, they are less likely to lose their orientation due to heat and other conditions. In other words, compared to prior art polarizing articles employing polarizing films and/or wafers, this preferred product of the present invention tends to have higher thermal stability.

A distinguishing point of the product of the present invention over the prior art is the presence of at least one inorganic intermediate layer between the substrate and the light polarizing layer. In a totally unexpected manner, the present inventors have discovered that, although the light polarizing dyes are organic in nature, their bonding to an inorganic intermediate layer, described in detail below, tends to be much stronger than that to a polymer intermediate layer as disclosed in French patent application publication No. 2861852. In addition, the inorganic intermediate layer, with the assistance of an optional inorganic sub-layer, tends to have a strong bonding with most substrate materials, including inorganic glass substrates and organic polymer substrates (which may comprise further surface layers on which the inorganic intermediate layer and optional sub-layer are formed, as described above). The use of an inorganic adhesion-promoting layer to improve the adhesion of an inorganic layer to an organic or inorganic substrate is known in the art. Techniques and equipment well known in the prior art may be used to form the inorganic intermediate layer and the optional inorganic sub-layer.

The inorganic intermediate layer is preferred to be an oxide of silicon, a metal oxide or a compatible mixture and/or combination thereof. Preferably, the inorganic intermediate layer is formed by a material selected from the group consisting of $SiO$, $SiO_2$, $Al_2O_3$, $ZrO_2$, $TiO_2$, $GeO_2$, and mixtures and combinations thereof. In a particularly preferred embodiment, the inorganic intermediate layer is formed of $SiO_2$. The present inventors have discovered that, the inorganic intermediate layer, especially $SiO_2$, can be formed with a strong bond with substrates made of inorganic glass materials and organic polymer materials, with or without additional surface coatings. Generally, the inorganic intermediate layer should have the light transmitting properties at the wavelength range in which the polarizing article is to be used. It is also contemplated that multiple layer of inorganic materials having differing compositions may be employed as the inorganic intermediate layer. Such multiple layer structure may be advantageously employed to reduce reflection at the interface between the inorganic intermediate layer and the substrate.

The thickness of the inorganic intermediate layer is on the microscopic scale. The thickness of the intermediate layer should be sufficient to allow the formation of the microgrooves substantially without revealing the substrate surface. Typically the inorganic intermediate layer has a thickness less than 10 μm, preferably less than 5 μm, still more preferably less than 1 μm. Generally, for plasma deposition, the thinner the coating, the less time is required for the deposition thereof.

For certain substrate, in order to obtain a strong adhesion between the inorganic intermediate layer and the substrate material, it is desired to form a thin inorganic sub-layer between the inorganic intermediate layer and the substrate. The sub-layer has a composition differing from that of the inorganic intermediate layer. The sub-layer is typically formed of silicon, an elemental metal, a metal oxide or an oxide of silicon. As non-limiting examples of elemental metals, mention can be made of chromium, molybdenum, nickel, titanium, iron and compatible combinations and/or mixtures thereof. It is well known that a metal layer can improve the adhesion between a metal oxide layer and an inorganic or organic material. As non-limiting examples of metal oxides, mention can be made of $Al_2O_3$, $ZrO_2$, $TiO_2$, $GeO_2$, and mixtures and combinations thereof. Silicon oxide may be SiO and/or $SiO_2$. Preferred sub-layer materials are chromium metal and SiO, especially for a $SiO_2$ intermediate layer.

The sub-layer is generally much thinner than the inorganic intermediate layer, usually on the nano-scale. Where the sub-layer is formed of an elemental metal, such as chromium, in order to ensure sufficient transmission, it is required that the thickness thereof is very low. Typically, the sub-layer has a thickness of less than 300 nm, preferably less than 100 nm, more preferably less than 20 nm. The inorganic sub-layer may be a single layer of atoms or molecules.

As non-limiting examples of a combination of the inorganic intermediate layer and the sub-layer, mention can be made of: (i) a sub-layer of SiO and a $SiO_2$ intermediate layer; and (ii) a sub-layer of chromium metal and a $SiO_2$ intermediate layer. The combination of SiO sub-layer and $SiO_2$ intermediate layer is believed to be particularly effective for substrates made of CR 39 (a thermosetting synthetic resin of diethylene glycol bisallyl carbonate) substrate. This monomer for this polymer has the following structure:

According to U.S. Pat. No. 4,130,672, high hardness antireflective film of SiO—$SiO_2$ can be formed on CR39 substrates.

The polarizing article of the present invention can be produced to be used at wide spectra of wavelength, ranging from UV to visible light, to infrared light. Preferably, the light polarizing article of the present invention is for use in visible light wavelength range.

The light polarizing article of the present invention may find application in many devices. Non-limiting examples of applications include: ophthalmic products; display products, particularly liquid crystal displays, including LCD monitors and LCD projectors; polarizing windows for vehicles, including land-based, air-born and water-based vehicles; facemasks, shields; building glass; and the like.

In general terms, the process of the present invention for the production of light polarizing article comprises the following steps:

(A) providing a light transmitting substrate having at least one surface;

(C) forming a light polarizing layer over at least part of the surface;

(D) forming a protective layer over and abutting the light polarizing layer;

characterized in that:

between steps (A) and (C), there is an additional step (B) as follows:

(B) depositing an inorganic intermediate layer between the polarizing layer and the substrate, said inorganic intermediate layer abutting the polarizing layer; and further in that step (C) comprises the following steps (C1) and (C2):

(C1) forming a plurality of substantially parallel micro-grooves on the surface farther from the substrate of the inorganic intermediate layer deposited in step (B); and (C2) depositing a light polarizing layer comprising polarizing dye over and abutting the micro-grooves formed in step (C1).

As discussed above, for certain substrate materials, it is desirable to add an inorganic sub-layer between the inorganic intermediate layer and the substrate in order to promote the adhesion between the inorganic intermediate layer and the substrate. Accordingly, those embodiments of the process of the present invention for the production of those articles further comprises an additional step (A1) after step (A) as follows:

(A1) forming at least one adhesion-promoting inorganic sub-layer different from the inorganic intermediate layer between the substrate and the inorganic intermediate layer;

wherein in step (B), the inorganic intermediate layer is formed directly over and abuts an inorganic sub-layer formed in step (A1).

In step (A), the substrate may have the structure and composition as discussed above in connection with the light polarizing article of the present invention. Generally speaking, such substrates may be surface polished, cleaned and dried before step (A1), if present, and step (B). Various surface cleaning techniques may be used. Sometimes In order to activate the surface for better adhering between the surface and the respective layers to be deposited, it is desirable to use plasma cleaning.

In addition, as part of step (A), surface coating may be applied to the body of the substrate. Such surface coating may include, for example, antireflective coatings, hardcoats, and the like. However, since the present invention has the advantage of being applicable to various types of substrate materials, deposition of those coatings are not compulsory. It is indeed oftentimes preferable not to form those base coatings in order to minimize the steps of production process. That said, the application of such addition surface coatings to the body of the substrate may be desirable for certain substrate materials, especially those made of organic polymer materials. In a totally non-limiting way, the surface coating may be notably based on silanes, e.g., on alkoxysilanes and/or chlorosilanes or on compositions with reactive groups of the following types: vinyl, epoxy, isocyanate, hydroxyl, amine, thiol, carboxylic acid and/or anhydride. Such compositions can include reactive groups of a single type (e.g., isocyanate) or reactive groups of at least two of the types above, which are obviously non-reactive with each other (e.g., isocyanate and vinyl). Particular examples of such surface coating include coatings based on γ-aminopropyltrimethoxysilane, γ-aminopropyltriethoxysilane and epoxyalkyltrialkoxysilane.

Regarding steps (A1) and (B), the inorganic intermediate layer and the inorganic sub-layer may be obtained by any technique well known by people skilled in the art and especially widely used in the semiconductor industry. For example, chemical vapor deposition (CVD) processes, such as plasma enhanced chemical vapor deposition (PECVD), low pressure chemical vapor deposition (LPCVD), sub-atmospheric chemical vapor deposition (SACVD); plasma vapor deposition (PVD) processes, such as ion-assisted electron beam evaporation, non ion-assisted electron beam evaporation and sputtering; as well as sol-gel processes, and the like, can be used.

Chemical vapor deposition (CVD) is a widely used materials-processing technology. A good reference book on CVD is *Chemical Vapor Deposition* (Eds. J-H Park et al.), *Surface Engineering Series*, Volume 2 (ASM International®, July 2001), the relevant portion of which is incorporated herein by reference. The majority of its applications involve applying solid thin-film coatings to surfaces. Stated simply, CVD involves flowing a precursor gas or gases into a chamber containing one or more heated objects to be coated. Chemical reactions occur on and near the hot surfaces, resulting in the deposition of a thin film on the surface. By-products along with unreacted precursor gases are exhausted out of the chamber. PECVD, LPCVD and SACVD are only a few variants of CVD techniques. CVD can be carried out at a wide range of temperature and pressure, with or without carrier gases. The majority of the elements in the periodic table have been deposited by CVD techniques, some in the form of the pure element, but more often combined to form compounds.

Among these CVD processes, PECVD is a preferred process for depositing the inorganic intermediate layer and the sub-layer, if present, in the process of the present invention. In a PECVD system, a RF source excites electrons in an electromagnetic field set up between a top electrode and a grounded substrate. The excited electrons collide with gas molecules to form ions/reactive neutrals or plasma. PECVD has several advantages over thermal CVD techniques. First, PECVD allows for a much lower deposition temperature and pressure. For example, the temperature for PECVD deposition of $SiO_2$ using $SiH_4$ and $O_2$ or $N_2O$ is typically between 200-400° C., in contrast to the 350-550° C. temperature required for thermal CVD. Second, by using a plasma, ion bombardment aides in making films denser, increases deposition rate, and promotes good film adhesion. Moreover, film uniformity in terms of microstructure and thickness can be achieved. Still another great advantage of PECVD is its ability in controlling residual film stress. By varying process parameters, the user can create films with compressive or tensile stress or without stress.

The plasma vapor deposition techniques do not involve a chemical reaction between the substrate surface and the material being deposited onto it. In the evaporation methods, the material to be deposited is heated in a vacuum, until it boils or sublimes to become a gas. The gas is transported to the substrate, where it is cooled and condenses onto the substrate surface to form the deposited layer. In sputtering, the material to be deposited is literally thrown at the wafer substrate at a high velocity. A wide variety of sputtering techniques have been developed. Thin films of many materials, including silicon dioxide, have been deposited using evaporation or sputtering techniques.

Sol-gel process for thin film formation involves the coating of a sol-gel of the material being deposited onto the surface of the substrate, followed by drying and heat treatment to form a dense interconnected film of the deposited material. In the case of silica, for example, a sol-gel material can be created by hydrolysis (acidic or alkaline or in neutral pH) of alkoxysilanes. The thus formed colloidal sol-gel is coated onto the substrate surface, dried and heat treated below 300° C. to form a dense coating. A higher temperature heat treatment may be used to sinter the film for a higher densification, if permitted, for example, where the substrate is based on inorganic glass.

Spray pyrolysis is another option for depositing the inorganic intermediate layer and the optional sub-layer.

Whatever coating deposition process is used, it is important that the coating deposition process does not adversely affect the composition and property of the substrate. For example, if the substrate comprises organic polymer material that deforms or degrades at a high temperature, the deposition of the inorganic intermediate layer and the optional sub-layer must be conducted below a threshold temperature. It is desirable that the deposited coating have strong adhesion to the substrate and other coatings. It is also desirable that the deposited coating has high mechanical strength and hardness for further down-stream processing such as brushing.

Thus, particularly preferred techniques are those based on ion assisted deposition (IAD), ion beam sputtering (IBS), plasma ions assisted deposition (PIAD) because they operate at near room temperature. IAD process for example produces coating with good physical properties but also can be applied to heat sensitive substrates such as plastics because the low temperature involved. This process results in direct deposition of ionized vapor and in adding activation energy by the highly effective ion bombardment during the growing of the film. In PIAD, various materials are evaporated using electron guns in conjunction with a plasma source.

Such deposition methods are well known by people skilled in the art of anti-reflection and anti-scratch coating. For example a process for the production of a reflection-reducing coating on lenses is described in U.S. Pat. No. 5,597,622. This process describes how to deposit a $SiO_2$ layer onto a CR39 plastic lens using a thin SiO adhesion layer. Both layers were deposited in a vacuum chamber which comprises a thermal vaporizer and a plasma source for irradiating the substrate simultaneously with application of the vaporized coating material.

Another example of vacuum deposition is described in U.S. Pat. No. 4,130,672. Indeed this patent relates to a method capable for coating silicon oxide SiO and silicon dioxide $SiO_2$ film on the surface of transparent optical material of glass or synthetic resin at low temperature (lower than 120°). This method utilizes the fact that silicon oxide is easily vacuum-deposited even at low temperature (100° C.). Using the appropriate condition of vacuum-deposition a durable coating can be easily obtained which comprises a SiO and a $SiO_2$ layers. Moreover the coating obtained exhibits a pencil hardness of 6-7 H which is twice as large as that of synthetic substrate such as CR39® and therefore well suited to be grooved by means of an abrasive brushing.

Plasma sputtering is a slightly different technology from plasma assisted deposition, although the final results are rather similar. Its main advantage is that cheaper coating can be produced.

Although SiO has good adhesion on plastic substrates even when directly deposited on the substrate it suffers of optically undesirable absorption. Therefore SiO is used primarily for the purpose of ensuring adhesion of a thicker SiO2 layer.

U.S. Pat. No. 5,597,622 mentioned that if $SiO_2$ layer is applied directly it adheres poorly on synthetic substrates. Such coating applied directly becomes very rapidly detached in boiling water tests for example after 5 to 10 minutes. In contrast, if SiO is used as an adhesion layer between the substrate and the $SiO_2$ layer the article passes successfully the boiling tests.

When SiO plus $SiO_2$ are used together the relative thicknesses must be adjusted in order to avoid detrimental reflection effect. This tuning is well known by people skilled in the art of anti-reflection coating deposition.

Despite its undesirable adsorption, SiO may be used as the inorganic intermediate layer, provided that the thickness is chosen in order that the absorption is kept within reasonable limit. Generally SiO layer has thicknesses from one molecule up to 100 nm. Preferably the thickness is up to 50 nm.

$SiO_2$ may be used in higher thickness as for example up to 500 nm. We have found that an appropriate thickness for the article of the invention is about 100 nm.

As mentioned above, the body of the substrate may be surface treated before the application of the inorganic intermediate layer and the optional inorganic sub-layer. For example, for certain plastic substrate materials, in order to obtain a good adhesion, it is also possible to form a silicone resin type curable hard layer on the surface prior to the deposition of the inorganic intermediate layer and the optional inorganic sub-layer. These silicone hard resins are well known as anti-scratch coatings or also called hardcoats. Example of such a deposition of silicone resin layer prior to vapor deposition of $SiO_2$ is described in JP 58042001. We have found that silicone resin sold under the trade mark HI-GARD® 1080 from PPG Industries, Inc. is particularly suitable and provides an acceptable adhesion and a good transmittance.

Such a silicone resin layer may be also needed to ensure a good resistance of the substrate to the highly energetic conditions that are involved when ion or plasma assisted techniques are used. A general rule is that lenses without hardcoat may be coated with metal oxide layer without ion assist, but substrates with hardcoats may be generally hard coated with ion or plasma assist. This is particularly useful with synthetic substrates that have poor thermal stability.

It is also well known that very thin metallic layer (such as chromium) can be used of order to obtain a higher adhesion of the oxide layer on the substrate. Indeed oxides normally do not normally adhere strongly to plastics. Being a metal, this layer must be extremely thin to prevent a grey color. Typical adhesion metal sub-layer thicknesses are only a few nanometers.

Methods and equipment for forming microgrooves and deposition of the polarizing layer thereon have been disclosed in French patent application publication No. 2861852, U.S. Pat. Nos. 4,683,153 and 2,400,877. The relevant contents of these references are relied upon and incorporated herein by reference in their entirety.

The formation of micro-grooves in the surface of the inorganic intermediate layer is advantageously achieved by brushing the surface. As a non-limiting example, a spinning wheel made of foam material, such as polyurethane form, soaked with a slurry of abrasive particles, can be used for brushing the surface. The slurry of the abrasive particles may be typical polishing slurry used in the art known to one of ordinary skill. The abrasive particles usually are on microscopic and sub-micron scale. The particles may be of, for example, $Al_2O_3$, $ZrO_2$, $TiO_2$, $CeO_2$, and the like, as long as they have higher hardness than the inorganic intermediate layer. Additives, such as viscosity modifying agents, may be added into the slurry as well. One of ordinary skill in the art can adjust the rotation speed of the brushing wheel, the pressure applied when brushing to obtain an optimum brushing result in an optimum brushing time.

Upon brushing of the intermediate layer, prior to the deposition of the polarizing layer, the substrate is usually thoroughly cleaned and dried.

The formation of the polarizing layer involves the coating of a solution or a suspension of a polarizing dye onto the surfaces of the inorganic intermediate layer, on which microgrooves have already been formed. The solution or suspension is advantageous water-based. As mentioned above, in order to obtain the desired color and hue of the polarizing article, sometimes multiple polarizing dyes having differing colors are used at various proportions in the polarizing dye solution. Furthermore, the polarizing dye solution may comprise, in addition to the dyes per se, additives. Those additives may include: (i) rheology modifiers; (ii) adhesion promoters; (iii) plasticizers; (iv) non-polarizing dyes, and the like. The deposition of the polarizing dye solution can be performed by using various coating techniques available in the art, for example, dip coating, flow coating, spin coating, spray coating, and the like, using conventional equipment.

After deposition of the dye solution over the microgrooves, it is often desirable to insolubilize and immobilize the polarizing dyes on the microgrooves. A preferred way to do so is to subject the coated substrate to an aqueous solution of a metal salt. U.S. Pat. No. 2,400,877 discloses methods and agents used for the insolubilization, the relevant part of which is relied upon and incorporated herein by reference. As non-limiting examples of such metal salts, mention can be made of $AlCl_3$, $BaCl_2$, $CdCl_2$, $ZnCl_2$, $SnCl_2$, and the like. $AlCl_3$ and $ZnCl_2$ are preferred for their low toxicity. Other salts than chlorides may be used. Generally, metal salts used in textile industry for insolubilizing dyes in water can be used. For example, metal salts of Al, Fe, Cr, and the like, may be used.

After insolubilization of the dyes on the surface of the inorganic intermediate layer, the surface is optionally further dried. In case the polarizing layer is subjected to treatment of an aqueous solution, such as that of a hardcoat, it may not be necessary to dry the polarizing layer. The polarizing dyes, with or without the aid of additives such as liquid crystal polymers, align with the micro-grooves. A light polarizing layer is thus formed.

The thus formed polarizing layer is usually not robust enough to withstand the wear and tear of the typical intended use of the final light polarizing article. Therefore, a further protective coating is usually desirable. Thus, in step (D) of the process of the present invention, a further protective layer is formed over the light polarizing layer. Similar to the surface coating on the substrate, described above, the protective coating may be notably based on silanes, e.g. on alkoxysilanes and/or chlorosilanes or on compositions with reactive groups of the following types: vinyl, epoxy, isocyanate, hydroxyl, amine, thiol, carboxylic acid and/or anhydride. Such compositions can include reactive groups of a single type (e.g., isocyanate) or reactive groups of at least two of the types above, which are obviously non-reactive with each other (e.g., isocyanate and vinyl). Particular examples of such surface coating include coatings based on γ-aminopropyltrimethoxysilane, γ-aminopropyltriethoxysilane and epoxyalkyltrialkoxysilane. These protective layers may be tintable (thus tinted or non-tinted) or non-tintable, depending on the application of the final polarizing article. Non-limiting examples of commercially available coating compositions for such protective layer include: UV cured coatings obtained from UV curable resin such as C4000-60, C5050-60 which are non-tintable, C5051-60 which is tintable and CRC-12 from LESCO, SCH 180, SHC 3100 and SHC Armour 500 from Lens Technology, LLC; thermally cured coatings such as those obtained from the two-component hard coating solution sold under the name TS56H or TS56 T from Tokuyama Corp. which are non-tintable and tintable respectively, or from the one-component HI-GARD® 1080 or HI-GARD® 1035 coating solution from PPG industries, Inc.

Over the protective coating, additional optional coatings may be formed. These coatings include, but are not limited to, hydrophobic (water-repellent or anti-fog) coatings; infrared absorbing coatings; UV absorbing coatings; anti-reflective coatings; photochromic coatings; cushion coatings (shock-absorbing flexible coatings); and the like. These coatings may also be formed on the side of the substrate opposite to the inorganic intermediate layer, the optional sub-layer and the polarizing layer.

Figure 1:
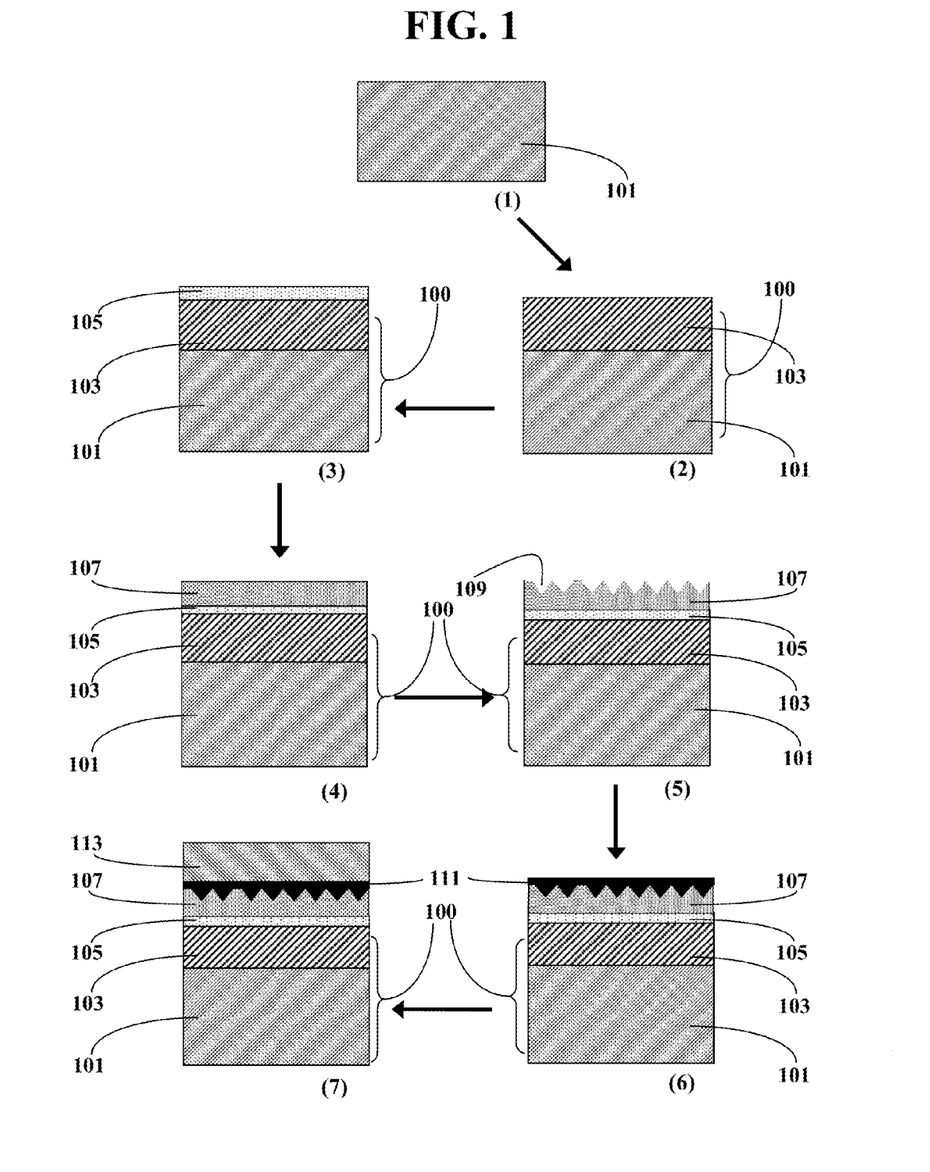
FIG. 1 is a schematic illustration of the structure and manufacture process thereof of an embodiment of the light polarizing article of the present invention.

FIG. 1 schematically illustrates one embodiment of the process of the present invention for producing an exemplary polarizing article of the present invention. In step (1), a substrate main body 101 is provided. In step (2), a hardcoat surface coating 103 is formed over one surface of the substrate body 101. The combination of 101 and 103 thus forms the substrate 100 in the meaning of the present application. Steps (1) and (2), combined, correspond to step (A) in the process claimed and described above. In step (3), an inorganic sub-layer 105 is formed on the top of the surface layer 103. Step (3) corresponds to step (A1) discussed above. In step (4), an inorganic intermediate layer 107 is formed on the top of the sub-layer 105. Step (4) corresponds to step (B) of the process described above. In step (5), the inorganic intermediate layer 107 is brushed to form a plurality of substantially parallel micro-grooves 109 on its top surface. Step (3) corresponds to step (C1) described above. In step (6), a polarizing layer 111 is deposited on the top of the polarizing layer 109. Step (6) corresponds to the step (C2) described above. In step (7), a protective layer 113 is formed on the top of the polarizing layer 109. Step (7) essentially corresponds to step (D) above. As is clear from the above description of the present invention, FIG. 1 is merely an illustration of one embodiment of the present invention. Some of the steps illustrated in FIG. 1 may not be required in the production of certain polarizing articles of the present invention. For example, steps (2) and (3) may be omitted for certain substrate materials.

As mentioned above, the process of the present invention may be applied for many different types of inorganic and organic substrate materials. The same inorganic intermediate layer, such as $SiO_2$ may be deposited on those different substrate materials to obtain similarly good results. Therefore, for different substrate materials, down-stream process steps (C) and (D) may be performed by using the same process parameters and equipment. This translates to consistency of product quality, higher production yield and lower production cost. The durability of the article produced is particularly high especially in high humidity or boiling tests. Further, the process of the present invention allows the articles of the present invention to be produced in individual small-scale ophthalmic prescription laboratories with relatively low cost.

The following non-limiting examples further illustrate the present invention.

EXAMPLES

Example 1

The Present Invention

A polyurethane-urea plastic lens sold under the trade name NXT® from Intercast Europe SPA was coated with a HI-GARD® 1080 coating according to the recommended guidelines from the resin supplier. The final hardcoat was 2-3 μm thick. After surface cleaning a 100 nanometers thick $SiO_2$ coating was vacuum-deposited using a thin chromium layer as adhesion layer deposited on the top of the hard coat prior the $SiO_2$ deposition.

Then the coated substrate was brushed with a wheel having the appropriate shape and made of polyurethane foam. The wheel was imbibed with abrasive slurry in order to get parallels microgrooves on the surface of the coated lens.

The abrasive slurry used was a mixture of water and micron size zirconia particles in order to provide a gentle abrasive brushing. The wheel speed was 340 rpm and the pressure of about 40 g/cm² applied for about 5 seconds. Then the grooved lens was rinsed with deionized water and dried under an infra-red lamp at 50° C. for 2 minutes. The dry lens was coated by spin coating with 2-3 grams of an aqueous solution containing about 5 wt % of polarizing dyes (Varilight solution 2S) supplied by Sterling Optics Inc (KY). The dye solution was applied at 300 rpm for 8 seconds, then the spinning speed was increased to 400 rpm for 45 seconds and then to 1000 rpm for 12 seconds.

At this step the dyed lens exhibits a polarization efficiency of 99% and a transmittance of 30.5%.

Then the polarizing coating was stabilized by immersing the lens in an aqueous solution containing aluminum chloride, calcium hydroxide and magnesium hydroxide at pH 4. This step converts the water soluble dye in its water insoluble form.

After that the lens was dipped in a 10 wt % aqueous solution of 3-aminopropyltriethoxysilane [919-30-2] for 15 min, rinsed with DI water 3 times and cured at 120° C. for 30 minutes.

After cooling the lens was immersed in a 2 wt % aqueous solution of 3-glycidoxypropyltrimethoxysilane [2530-83-8] for 30 minutes and cured in an oven at 100° C. for 30 min. After cooling the lens was protected by application of a 2 μm thick acrylic based anti-scratch coating. The anti-scratch coating resin used is sold under the reference SHC 180 from Lens Technology International (CA) modified by adding 1.6 wt % of 3-methacryloxypropyltrimethoxysilane [2530-85-0]. The resin was applied by spin coating with a spin out speed of 1000 rpm for 45 seconds and was cured by exposure to UV light from a fusion bulb H lamp at a belt speed of 2 feet per minute (2 passes).

The polarization efficiency ($P_{eff}$) was determined by measuring the parallel transmittance ($T_\parallel$) and perpendicular transmittance ($T_\perp$) using a visible spectrophotometer and a polarizer. The Polarization efficiency was calculated using the following formula:

$$P_{eff} \% = \frac{T_\parallel - T_\perp}{T_\parallel + T_\perp} \times 100\%$$

The chemical durability of the lens produced was evaluated by soaking the polarizing lens in boiling water for 3 hours. The adhesion level was evaluated before and after the boiling test by trying to peel off the coatings by means of a standard adhesive tape.

Results:

The Polarization efficiency was 97% before boiling test.

Polarizing lenses immersed 3 hours in boiling water showed no delaminating and exhibit a Polarization efficiency of 97% (no change).

Example 2

Comparative Example

The same process was reproduced as described in example 1 except that the adhesion layer and the $SiO_2$ layer were omitted. Hence the Hard coat HI-GARD® 1080 was directly grooved.

The polarization efficiency was 98% after dye deposition and 96% after the complete process. Layer delaminating occurred to some lenses during the aqueous treatments such as aluminum chloride treatment or silane treatment leading to unacceptable cosmetic defects. None of the lenses survived to the boiling water test.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

The invention claimed is:

1. A process for making a light polarizing article, the process comprising the steps of:
    (a) providing a light transmitting substrate having at least one surface;
    (b) forming at least one adhesion-promoting inorganic sub-layer on the substrate;
    (c) depositing an inorganic intermediate layer directly over and abutting the at least one adhesion-promoting inorganic sub-layer, the inorganic intermediate layer having a first surface abutting the substrate and a second surface distal from the substrate, wherein the inorganic intermediate layer is different from the at least one adhesion-promoting inorganic sub-layer;
    (d) forming a plurality of micro-grooves on the second surface of the inorganic intermediate layer, wherein the plurality of microgrooves are substantially parallel to each other;
    (e) depositing an organic light polarizing dye directly onto the second surface to form a light polarizing layer over at least a portion of the second surface, wherein the organic light polarizing dye are deposited and confined in and aligned by the plurality of microgrooves; and
    (f) forming a protective layer over and abutting the light polarizing layer.

2. The process according to claim 1, wherein the intermediate layer comprises at least one of an oxide of silicon, a metal oxide, and combination thereof.

3. The process in accordance with claim 2, wherein the intermediate layer is formed from a material selected from the group consisting of oxides of Si, Al, Zr, Ti, Ge, Sn, In, Zn, Sb, Ta, Nb, V, Y, La, mixtures thereof, and combinations thereof.

4. The process according to claim 1, wherein the at least one inorganic sub-layer comprises at least one of silicon, an elemental metal, an oxide of silicon, and an oxide of a metal.

5. The process according to claim 4, wherein the at least one inorganic sub-layer is chromium metal or SiO.

6. The process according to claim 1, wherein the substrate comprises at least one hardcoat, and wherein the inorganic intermediate layer is deposited over the hardcoat.

7. The process according to claim 1, wherein the substrate comprises an organic polymer.

8. The process according to claim 1, wherein the light polarizing layer deposited comprises at least one dichroic dye.

* * * * *